United States Patent Office 3,277,221
Patented Oct. 4, 1966

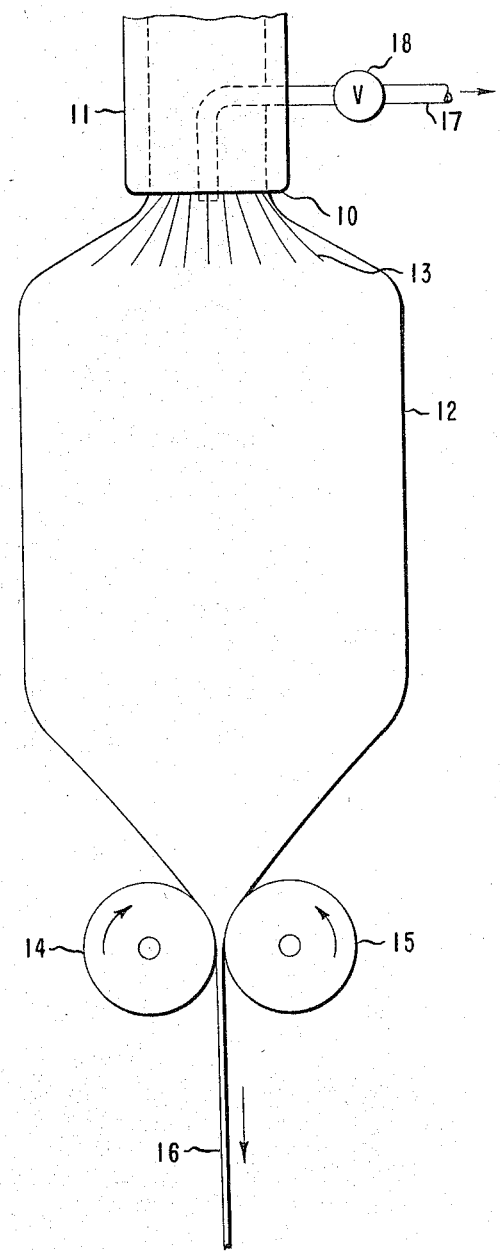

3,277,221
METHOD FOR MAKING A COLLAPSED ULTRAMICROCELLULAR STRUCTURE
Robert Guy Parrish, Wilmington, Del., assignor to E. I. du Pont de Nemours and Company, Wilmington, Del., a corporation of Delaware
Filed Nov. 27, 1963, Ser. No. 326,444
5 Claims. (Cl. 264—53)

This invention is concerned with a continuous process for producing an ultramicrocellular sheet product. More particularly, it is concerned with a blown film extrusion process utilizing a machine direction drawing operation to form a biaxially stretched ultramicrocellular sheet product in which the individual polyhedral cells are permanently flattened or collapsed.

Crystalline polymeric ultramicrocellular structures and methods for their production are described in copending U.S. application, Serial No. 170,187, filed January 31, 1962, now U.S. Patent No. 3,227,664. The ultramicrocellular structures are particularly unique owing to the polyhedral shaped structure of their cells, to the film-like character of the cell walls, and to the uniform texture and high degree of molecular orientation, i.e., uniplanar orientation, existing in those walls. Together these features serve to define a class of materials which, in comparison with prior art cellular structures, exhibit outstanding strength and resiliency properties although fabricated at extremely low densities. From the standpoint of still other desirable characteristics, the ultramicrocellular structures are supple, opaque, pneumatic, and have an exceedingly high bulk and low thermal conductivity (or $k$ factor). Because of this superior combination of properties and the fact that they can be produced in sheet, filament or other shaped or bulk form, the ultramicrocellular structures are well adapted to a great variety of end uses.

As disclosed in the aforementioned U.S. application, the ultramicrocellular structures may be prepared from a solution of a crystalline synthetic organic polymer in an activating liquid held at super-atmospheric pressure and a temperature above the boiling point of the activating liquid. At temperatures below its normal boiling point, the activating liquid does not dissolve appreciable quantities of the polymer. Flash evaporation of the activating liquid on extrusion of the solution into a region of lower pressure and temperature under conditions of high bubble nucleation generates an ultramicrocellular product and rapidly quenches (within 0.01 sec.) and freezes in the polymer orientation produced during extrusion of the solution and expansion of the bubbles.

As further disclosed in Belgian Patent 625,829, the ultramicrocellular sheet products may be subsequently mechanically compressed beyond their yield point to produce useful semi-textile-like or paper-like products having flattened or collapsed cells. Because the initial extruded sheets are of a pneumatic character, however, it is normally difficult to effect such a mechanical compression at operating speeds which are regarded as essential for reasons of efficiency and economy.

It is an object of the present invention to provide an improved method for the production of ultramicrocellular sheet structures in the form of semi-textile-like or paper-like products having flattened or collapsed cells. Still a further object is to provide such a method which can be performed efficiently and economically on a continuous basis. Another object of the invention relates to the provision of such a method whereby the flattening or collapse of the cells of an ultramicrocellular structure is carried out in conjunction with the initial extrusion of the ultramicrocellular structure in blown tube form.

In accordance with the invention, these objects are accomplished in a method wherein a solution of a high molecular weight synthetic crystalline hydrocarbon polymer in an activating liquid is extruded through an annular orifice to generate an ultramicrocellular structure in the form of a blown tube. In this method stretching of the tube is effected by confining at least a portion of vaporizing activating liquid therein and, further, the laterally stretched tube is pinched between a pair of rotating pressure rolls to form a sheet. The improvement of the present invention, whereby a semi-textile-like or paper-like sheet product of collapsed cells is obtained, comprises rotating the pressure rolls at a surface speed to longitudinally stretch the tube, the longitudinal and lateral stretching combining to effect an area production rate which is at least twice the natural area production rate. By virtue of the combined lateral and longitudinal stretching, the product thickness is only a fraction of that which would otherwise be obtained. The cells of the product can be seen, microscopically at least, to be in a flattened or collapsed condition. Although the polyhedral ultramicrocellular character is retained, the products are considerably denser and less pneumatic because of the increased area production rate. In some cases internal contacting cell wall faces are bonded to one another. Because of these characteristics, the products formed in accordance with the invention are highly stable and possess improved tensile properties.

Blown film extrusion techniques are well-known in the dense film extrusion art. A molten thermo-plastic polymer is extruded through an annular die of a given circumference. A source of super-atmospheric gas pressure is connected to an orifice located within the die annulus so that when the downstream side of the extruded tube is closed off, either by leading the tube over an internal forming device or by pinching it closed between a pair of pressure rolls, the internal gas pressure may be raised to cause the tube to become expanded beyond its normal diameter as defined by the extrusion die. The internal gas pressure and the temperature of the extrudate must be carefully regulated to avoid over-blowing and "exploding" the tube, and either external post-extrusion quenching or heating is frequently required. This technique is useful for producing thinner gages of film than can be extruded directly, as well as for introducing a certain amount of polymer orientation to improve the tensile properties of the dense film products.

In a few instances the blown film technique has heretofore been applied to the extrusion of cellular tubular products in order to assist in avoiding undesriable corrugations which normally are experienced during extrusion of a cell forming mass. Thus in the prior art foam generating techniques, a thermoplastic polymer is melted and mixed with a gas generating blowing agent (e.g. a solid which thermally decomposes to gaseous products or a small quantity of a liquid which vaporizes at the extrusion temperature) just prior to extrusion through an orifice. When the extrudate emerges into the low pressure ambient region, expansion of the gaseous agent blows internal bubbles in the sheet and thus tends to increase its volume by increasing its length, width and thickness. The length increase is readily accommodated by adjusting the speed of the take-up device, and the thickness increase is simply a manifestation of the desired bulk density decrease on forming the cellular product. The expansion in the lateral direction, however, is more or less difficult to accommodate depending on the speed of foam generation. Since the annular die circumference is fixed, the lateral expansion of the sheet ordinarily produces folds or corrugations running the length of the tube. The severity of these will depend on the distance between the extrusion die and the point at which foam expansion is complete. The blown film extrusion technique has therefore been employed to open up the tube and minimize the severity of these longitudinal corrugations and the degree of "blowing" is adjusted to just accomplish this objective.

The process of the present invention is distinguished from the prior art blown film foam extrusion processes in several significant respects. In the first place, higher internal gas pressures are used so that the tube is expanded laterally beyond the point required just to remove the longitudinal corrugations. Secondly a longitudinal (machine direction) draw or stretching is simultaneously imposed between the extrusion die and downstream mechanically driven pinch rolls. Further no external super-atmospheric pressure gas supply is required to inflate the tube. According to the invention, escape of the cell-generating activating liquid vapor from the internal surface of the tube furnishes more than adequate internal gas pressure to effect the required expansion ratio, and excess activating liquid vapor is actually bled off during operation. Internal bonding of juxtaposed faces of the collapsed cells is facilitated because no adventitious gases must be supplied to inflate the tube.

Beyond just minimizing the longitudinal folds or pleats formed during the cell generation and expansion, the degree of simultaneous longitudinal and transverse drawing employed in the process of this invention is regulated so as to distort and collapse the individual polyhedral cells of the tubular sheet product to yield directly a relatively high density product. The individual draw ratios in the transverse and machine directions may be varied independently so long as the area production rate is at least twice the natural area production rate. By the term "natural area production rate" is meant that area of an ultramicrocellular structure which would be produced, per a given unit of time, under identical extrusion conditions if no lateral or longitudinal stretching was effected; that is, if the longitudinal tension upon the tube following discharge from the extrusion orifice is zero and if the pressure internally of the tube is not allowed to exceed pressure outside of the tube, e.g. atmospheric pressure. Such a tube produced in the absence of lateral or longitudinal stretching may be regarded as a "free-fall" product. By regulating the cojoint application of lateral and longitudinal stretching to effect at least a doubling of the area production rate, the cells of the extrudate will necessarily collapse.

Collapsing of the ultramicrocellular structure is most efficient when the lateral and longitudinal draw ratios are approximately equal, and the preferred operating conditions are thus when both draw ratios are at least about 1.5×. Under these conditions, the thickness of the sheet decreases by a factor of 20 or more due to the cell collapse, so that the density of the biaxially stretched products is a factor of 10 or more higher than the density of an as-extruded free-fall product.

The process of the invention will be further described with reference to the schematic illustration of FIGURE I. The solution of polymer in an activating liquid under super-atmospheric pressure, the temperature being above the normal boiling point of the activating liquid, is extruded through annular orifice 10 of die 11 into a region at atmospheric pressure and room temperature. Flash evaporation of the activating liquid with consequent cell generation and quenching of the polymer to a temperature below its softening point occur very rapidly, so that at a representative extrusion velocity of about 120 y.p.m. the ultramicorcellular structure in the form of a blown tube 12 is completely inflated and the cell walls are quenched within 1" of the extrusion orifice. The accompanying lateral expansion due to the forming action generates longitudinal folds 13. These folds disappear as the tube diameter is expanded by the internal super-atmospheric pressure generated by escape of excess lateral expansion is continued beyond the point where folds 13 disappear, the excess expansion serving to flatten and collapse the cells. Pinch rolls 14 and 15, which are mechanically driven by means, not shown, serve the multiple purposes of flattening the tube into a double sheet 16, confining the super-atmospheric internal pressure to the region between the nip of rolls 14 and 15 and the die orifice 10, and simultaneously longitudinally stretching the tubular product by frictionally engaging the outer surface of the tube and advancing it at a velocity in excess of the natural area production rate. Once the desired lateral expansion ratio is established by building up the internal tube pressure to the proper value, the internal volume between die orifice 10 and pinch rolls 14 and 15 is defined. Additional quantities of activating liquid which escape from the internal surface of the tube as fresh quantities of solution are extruded are then vented through relief tube 17 by operation of control valve 18 to hold the internal pressure constant to produce a uniform stable product throughout a continuous operation.

In order to produce collapsed-cell sheet products, the longitudinal and lateral drawing must be combined in such a way as to produce an area increase (or a basis weight decrease) by a factor of 2 or more over that of a free-fall product which is extruded under otherwise comparable conditions. (Free-fall products frequently contain pleats or folds as produced. These are to be removed e.g., by spreading the samples laterally before making the basis weight or area comparison.) A cellular sheet extruded with neither longitudinal nor lateral drawing (i.e. free-fall) ordinarily exhibits highly directional tensile properties and low bulk density. It is possible, by employing prior art blown film techniques with approximately a 2× lateral stretching, to achieve a more nearly balanced property product. However, a spontaneous contraction in the longitudinal direction occurs simultaneously with the lateral stretching so that the basis weight decreases only about 20%, the bulk density remains essentially unchanged, and substantially no flattening of the cells occurs. In contrast, by regulating both longitudinal and lateral draw ratios, the present process is able to produce collapsed-cell products.

When it is desirable to achieve the maximum degree of internal bonding of the collapsed cell product, it is advantageous to minimize the degree of self-quenching occurring on extrusion of the super-heated polymer solution through the annular die. Factors assisting in achieving this goal are relatively high polymer concentration and solution temperature (e.g. conditions approaching those which yield sintered products) and relatively low extrusion velocity (e.g. restricted extrusion orifice and minimum pressure drop across the orifice consistent with prevention of premature activating liquid vaporization upstream of the orifice). The special feature of this invention wherein the activating liquid vapor itself is employed as the gaseous tube expanding agent also contributes to retaining the internal cell faces in an active self-bondable condition. Such internal bonding appears to consist of a permanent fusing of the juxtaposed faces of the collapsed cells. These bonded structures thus appear to be "locked in place" and exhibit higher tensile moduli, higher tensile force at 5% elongation, and preserve their high density collapsed structure in spite of exposure to various post-inflation treatments. A further advantage of the present process is that collapse of the cells is much more rapidly and easily effected by applying the mechanical stretching and collapsing forces to the freshly generated cellular product before enough time has elapsed for any appreciable quantity of air to have diffused into the cells where it would serve to resist subsequent collapsing treatments.

A detailed description will now be given of characteristics of the ultarmicrocellular structures which are produced in blown tube form and, immediately following extrusion, are flattened into paper-like and semi-textile-like products. To a large extent it is these characteristics which give rise to sheet products of unusual properties following biaxial stretching to effect a reduction in thickness.

As regards the production of ultramicrocellular structures in as-extruded form, i.e. before biaxial stretching, substantially all of the polymer is present as filmy elements whose thickness is less than 2 microns, preferably under 0.5 micron. The term "drained foam" is aptly descriptive of such ultramicrocellular structures. The thickness of a cell wall, bounded by intersections with other walls, does not ordinarily vary by more than ±30%. Adjacent walls frequently will have generally equal thickness values, such as within a factor of 3. The polymer in the cell walls exhibits uniform texture and uniplanar orientation. The apparent density of the ultramicrocellular products is between 0.5 and 0.005 g./cc. The number of cells per cc. is desirably at least $10^3$, although values of $10^5$ or greater are preferred. As a suitable starting material for purposes of the present invention, however, they should have a density less than about 0.17 g./cc.

In the case of an as-extruded microcellular structure, the cell wall thickness can be determined by microscopic examination of cross sections. Thus 20–60 micron thick sections may be cut from a frozen sample with a razor blade. Large cell (>50 microns) samples are frozen directly in liquid nitrogen. Smaller celled samples are preferably "imbedded" in water containing a detergent, and then frozen and sectioned. The transverse dimension of one or more cells can also be readily measured by freezing and sectioning techniques. The cells are found to exhibit a general polyhedral shape, similar to the shape of the internal bubbles in a foam of soap suds. The average transverse dimension of the cells should be less than 1000 microns, preferably less than 300 microns, and the mutually perpendicular transverse dimensions of a single cell should not vary by more than a factor of three. The ratio of the cell volume to the cube of the wall thickness can be calculated and exceeds about 200. For very thin walled samples (>1 micron), the wall thickness is preferably measured with an interferometer microscope. A layer of the sample is peeled off by contact with "Scotch Tape." The layer is freed from the tape by immersion in chloroform and subsequently placed on the stage of the microscope for measurement.

The term "uniplanar orientation" employed with respect to the as-extruded ultramicrocellular structures may be fully understood from the following discussion. As will be described in greater detail in subsequent portions of the specification, the paper-like and semi-textile-like products of the present invention also possess uniplanar orientation. "Axial," "planar," and "uniplanar" indicate different types of molecular orientation of high polymeric materials. "Axial orientation" refers to the perfection with which the molecular chains in a sample are aligned with respect to a given direction, or axis, in the sample. For example, prior art filaments which have been drawn in one direction only generally exhibit an appreciable degree of axial orientation along the stretch direction. "Planar orientation" refers to the perfection with which the molecular chains are oriented parallel to a surface of the sample. "Uniplanar orientation" is a higher type of polymer orientation in that it refers to the perfection with which some specific crystalline plane (which must include the molecular chain) in each polymer crystallite is aligned parallel to the surface of the sample. Obviously, only crystalline polymers can exhibit uniplanar orientation. These three types of molecular orientation may occur singly or in combination; for example, a sample might simultaneously exhibit uniplanar and axial orientation.

Electron diffraction furnishes a convenient technique for observing the presence of uniplanar orientation. A single cell wall is placed perpendicular to the electron beam. Since the Bragg angle for electron diffraction is so small, only crystalline planes essentially parallel to the beam (perpendicular to the wall surface) will exhibit diffraction. If the sample does in fact have perfect uniplanar orientation, there is some crystallographic plane which occurs only parallel to the film surface and, therefore, will be unable to contribute to the diffraction pattern. Thus, the observed pattern will lack at least one of the equatorial diffractions normally observed for an axially oriented sample of the same polymer. If the degree of uniplanar orientation is somewhat less than perfect, there may be a few crystallites tilted far enough to contribute some intensity to the diffraction pattern, but at least one of the equatorial diffraction intensities will be appreciably less than normal. Thus, for the purpose of this invention, a sample is considered to have uniplanar orientation when at least one of the equatorial diffractions appears with less than one-half its normal relative intensity as determined on a standard which is a randomly oriented sample of the same polymer.

An alternative and occasionally more convenient technique for detecting the presence of uniplanar orientation in a sample is to observe the electron diffraction pattern as the plane of the sample is tilted with respect to the electron beam. (In case the sample also exhibits axial orientation, the tilt axis is preferably parallel to the orientation axis.) For uniplanar-oriented samples, first one crystallographic diffraction plane and then another will assume the position required for Bragg diffraction, so that first one and then another lateral diffraction will appear and then disappear as the sample rotation continues. The more perfect the degree of uniplanar orientation, the more sharply defined is the angle at which any particular diffraction appears. When a plot of diffraction intensity (corrected for sample thickness variation) vs. angle of sample tilt is prepared for any of the lateral diffractions, the distance in "degrees tilt" between points of half-maximum intensity may be readily determined. Only samples having uniplanar orientation will have half-maximum intensity points separated by 90° or less, and this will serve as an alternate criterion for the presence of uniplanar orientation.

One precaution must be observed in making this measurement. If the sample field examined by the electron beam is stopped down so far that it "sees" only one crystallite at a time, it will always be possible, even for a randomly oriented sample, to find some crystallite oriented parallel to the sample surface which would, of course, give an "uniplanar orientation" diffraction pattern. In order to insure that the "uniplanar orientation" pertains to the whole film element and not just to one crystallite, the measurement should be made examining a field of at least 100 square microns area, which is large enough to include the contributions from many crystallites simultaneously. Other techniques of measuring uniplanar orientation and their co-relation with electron diffraction measurements are described in the J. Pol. Sci. 31, 335 (1958) in an article by R. S. Stein.

The term "uniform texture" applied to the polymer in the cell walls of an as-extruded ultramicrocellular product means that the orientation, density, and thickness of the polymer is substantially uniform over the whole area of a cell wall, examined with a resolution of approximately ½ micron. This is best determined by observing the optical birefringence in the plane of a wall of a cell removed from the sample. For ultramicrocellular samples with a net over-all axial orientation, the individual cell walls will also normally exhibit an axial orientation in addition to the required uniplanar orientation. In the birefringence test, such products of the present invention will show a uniform extinction over the whole area of the cell wall. Samples with no net axial orientation must show a uniform lack of birefringence over their whole area rather than numerous small patches of orientation with each patch oriented at random with respect to the others. Lacy or cobweb-like cell walls, of course, do not have uniform birefringence over the whole area of a cell wall, and such products are readily distinguished from the uniform textured products of this invention. After biaxially stretching an as-extruded ultramicrocellular sheet in accordance with the invention the cell walls continue to exhibit uniform texture.

The present invention is concerned with extrusion of ultramicrocellular sheet structures prepared from a polyhydrocarbon, e.g., a high molecular weight hydrocarbon polymer. Since only crystallizable or crystalline polymers are suitable in the process of preparing the ultramicrocellular sheets, for the purposes of this invention linear polyethylene, polypropylene and crystallizable copolymers or graft polymers of ethylene and propylene with other monomers such as 1-olefins of up to ten carbon atoms are preferred. Blends of such polymers are also suitable. Other operable polymers include poly(3-methyl butene), poly(4-methyl pentene), isotactic polystyrene, and the like. Suitable activating liquids are described in the aforementioned U.S. application 170,187 and in Belgian Patent 568,524. Among those most preferred are hexane, pentane, butane, methylene chloride, and trichlorofluoromethane. In order to take full advantage of the process and produce products with the highest tensile properties, it is preferred to use polymers of low melt index. The biaxial stretching should be carried out above the brittle temperature (ASTM Method D-746-57T) of the polymer as measured in the presence of residual activating liquid.

The as-extruded ultramicrocellular sheet structures will consist essentially of polyhedral shaped cells including both closed cells and open cells (tubular structures of varying length arranged in a sponge-like structure) in any proportion, depending on the choice of operating conditions. There may also ocur a minor amount of fibrillar material, but the as-extruded ultramicrocellular sheet is a coherent unitary structure.

According to the present invention, the low density as-extruded sheets are biaxially stretched to permanently reduce their thickness and to increase their density. It is a surprising feature of this invention that such two-way stretching does not destroy and render worthless the cellular sheet structure, but rather converts it into a different form, specifically into paper-like or semi-textile-like products. In addition, it has been found that such stretching increases the tensile strength of the sheets. A tensile above 5 lb./in.//oz./yd.$^2$ in the machine direction and above 1.5 lb./in.//oz./yd.$^2$ in the transverse or cross direction is readily attained.

The collapsed, densified sheet product of the invention may be described as an integral structure of a crystalline hydrocarbon polymer comprising flattened polyhedral cells whose walls have an average film thickness below 2 microns and are aligned substantially in the plane of the sheet. The walls of the individual cells possess uniplanar orientation and uniform texture and the smallest cellular dimension, which would correspond to the height of a flattened cell is below 50 microns, preferably below 10 microns. The second largest dimension of the polyhedral cells is on the average between 1 and 3000 microns, but at least 3 times the height.

The measurement of the wall film thickness may be made with an interferometer microscope at 400 magnifications. In one technique a layer of the sheet is peeled off by contact with "Scotch Tape." The layer is freed from the tape by immersion in chloroform and placed on the stage of the microscope for measurement. The second largest cellular dimension is measured on a polarizing microscope at 300×, the dimension being the distance between the ridges representing side walls or remnants thereof on a layer of the sheet obtained as above. The sample is immersed in oil of about 1.5 refractive index for this determination.

The height of the flattened cell is calculated by the formula

Height = $(2.5/d - 1)_t$ where $d$ is the density of the sheet in grams/cc. determined from the basis weight and sheet thickness, and $t$ is the wall film thickness determined as described above. The fact that the cellular walls are substantially aligned in the plane of the sheet is evidenced by the positive birefringence in a plane perpendicular to the surface of the sample, i.e., the index of refraction measured parallel to the surface of the sheet is greater than the index of refraction measured perpendicular to the surface of the sheet. This determination is made in the manner described by Chamot and Mason "Handbook of Chemical Microscopy," vol. 1. A 10 micron section of the sheet in ice is cut as the specimen with a freezing microtome. The sign of the birefringence is measured with a low power polarizing microscope and a first order red plate. The magnification employed should preferably be too low to distinguish the individual cell walls, and the positive birefringence must apply to the section as a whole, not just the surface layers of the sample. These 10 micron sections may often conveniently be used for the interferometric determination of wall thickness, provided the walls are placed parallel to the plane of the sample by compressing the section.

The cellular sheet products of this invention may also be subsequently subjected to a thermal annealing treatment comprising exposing the sample to a temperature between the glass transition temperature and the polymer crystalline melting point. Under these conditions a change in crystallite size occurs. This molecular rearrangement does not destroy the perfection of crystallite uniplanar orientation, but does create a tendency for each cell wall to contract in area during thermal annealing. Evidence tends to indicate that such is attended by a loss in uniformity in thickness of the film-like cell walls, at least on a micro-scale, as the crystallites seem to grow laterally— e.g., in the wall-thickness direction—at the expense of the quantity of polymer in the surrounding regions. As a consequence, a sample which is unrestrained during the annealing treatment is observed to shrink in size. However, if the cellular sheet is subjected to bilateral restraining forces (e.g., by clamping its edges or by heating between press platens), the tendency of the individual cell walls to contract during annealing sets up internal stresses in the sample. The results appear to be almost as if the sample had been bilaterally drawn: the cells collapse in the thickness-dimension of the sheet and the tensile properties of the sheet increase. Thus, annealing increases the initial modulus, tensile yield strength, and Clark Stiffness (TAPPI Test T-451) of either compressed of stretched sheets, thus further enhancing their utility, for example, as printing paper where low deformation and high stiffness are desirable. It appears that some rupturing of the cell walls, or perhaps some fusion of the juxtaposed cell wall faces, must also occur, as samples are annealed under restraint.

The present invention is further illustrated by the following examples:

Example 1

Linear polyethylene of melt index 0.5 is fed to a heated 2″ Egan extruder provided with a 15/1 $L/D$ screw followed by a 11/1 $L/D$ mixing section. Methylene chloride is charged into the molten polymer stream at the entrance to the mixing section by a McCannimeter pump at a weight flow rate equal to that of the polymer. In addition, 1% by weight of "Santocel" 54 silica aerogel is provided as nucleating agent to assist bubble formation on subsequent extrusion. The 50% solution discharged from the mixing section is fed into a holding vessel under pressure, and its temperature is brought to 150° C. When temperature equilibrium is reached, a valve is opened to supply solution at a pressure of 300 p.s.i.g. to a 1.5″ diameter annular die of .005″ gap width and .010″ land length. The seamless cellular tube which is generated is led between pinch rolls driven at a surface speed of 125 y.p.m. Diffusion of methylene chloride vapor into the interior of the tube provides an internal super-atmospheric pressure which is regulated at approximately 5″ water gage pressure by bleeding off excess vapor through a tube, provided with a valve, which leads from the atmosphere to the center of the die. This internal pressure is sufficient to expand the tube to a diameter of 6.7″. The enforced longitudinal and lateral drawing imposed by the lateral expansion and driven pinch rolls provides a sheet weighing 0.14 oz./yd.$^2$ contrasted with a (pleat-free) free-fall sheet weighing 0.3 oz./yd.$^2$. In addition to reducing the sheet weight by a factor of 2, the biaxial drawing produces a 10 fold denser collapser-cell product of density 0.18 g./cc. compared with a density of 0.018 g./cc. for the free-fall product.

*Example II*

A linear polyethylene collapsed-cell sheet is extruded in a process similar to Example I except that the activating liquid is fluorotrichloromethane, the solution concentration is 50%, 0.75% "Santocel" is used, the extrusion temperature is 145° C., the extrusion pressure is 300 p.s.i.g., the annular extrusion die has a .010″ gap and a .020″ land, the pinch roll surface speed is 110 y.p.m. and the tube is expanded laterally by the superatmospheric internal pressure by a factor of 7.2×. This biaxially stretched tubular product has a weight of 0.27 oz./yd.$^2$ and a density of 0.28 g./cc., indicative of its highly collapsed state as compared with 0.45 oz./yd.$^2$ and 0.02 g./cc. for the free-fall product.

Separate portions of the collapsed sheet are annealed for one minute in steam at temperatures of 124 and 130° C. to produce even higher degrees of internal bonding as indicated by the following properties:

| Annealing Treatment (1 minute in steam) | None | 124° C. | 130° C. |
|---|---|---|---|
| Sheet wt. (oz./yd.$^2$) | 0.27 | .28 | .27 |
| Opacity (percent) | 60 | 50 | 39 |
| Sheet Density (g./cc.) | 0.28 | 0.26 | 0.32 |
| Tensile St. (lbs./in.//oz./yd.$^2$): | | | |
| MD | 8.4 | 10.0 | 9.7 |
| TD | 7.7 | 8.3 | 8.5 |
| Elongation (percent): | | | |
| MD | 72 | 73 | 74 |
| TD | 28 | 20 | 17 |
| Initial Modulus (lbs./in.//oz./yd.$^2$): | | | |
| MD | 60 | 175 | 200 |
| TD | 60 | 140 | 240 |
| Force at 5% Elongation (lbs./in.//oz./yd.$^2$): | | | |
| MD | 2.3 | 4.2 | 4.6 |
| TD | 2.5 | 4.5 | 5.6 |

For comparison, the initial modulus and force at 5% elongation (a measure of stiffness) for low density uncollapsed, unbonded, free-fall products is approximately 15 lb./in.//oz./yd.$^2$ and 0.6 lb./in.//oz./yd.$^2$.

*Example III*

Linear polyethylene of melt index 0.5 is fed through a heated extruder at a rate of 156 g./min. The molten polymer is advanced to a mixing section under a pressure of 850 p.s.i.g., where methylene chloride is metered in at 177 g./min. and chlorodifluoromethane at 37 g./min. at a pressure of approximately 875 p.s.i.g. The resulting 42% polymer solution is extruded at a temperature of 156° C. and pressure of 650 p.s.i.g. through a ½″ diameter annular die with a 0.010″ gap preceded by a 40 mesh/100 mesh/40 mesh screen filter pack. The resulting foam tube extrudes at approximately 50 y.p.m. free-fall velocity. This tube is lead between pinch rolls driven at 96 y.p.m., and the pressure inside the tube (generated by escaping activating liquid vapors) is allowed to rise until the lateral expansion ratio is 3.3×. The product is a collapsed-cell foam sheet, density 0.17 g./cc. and thickness 0.0049 inch, having uniplanar orientation of the polymer in the cell walls.

What is claimed is:

1. In a method for the production of an ultra-microcellular structure in sheet form wherein a solution of a high molecular weight synthetic crystalline hydrocarbon polymer in an activating liquid is extruded through an annular orifice to generate said ultramicrocellular structure in the form of a blown tube, wherein lateral stretching of the tube is effected by confining at least a portion of vaporizing activating liquid therein, and wherein the laterally stretched tube is pinched between a pair of rotating pressure rolls to form a sheet, said ultramicrocellular structure being composed of polyhedral shaped cells wherein substantially all of the polymer is present as filmy elements of a thickness less than 2 microns and wherein the polymer in the cell walls exhibits uniplanar orientation and a uniform texture; the improvement, for obtaining a semi-textile-like or paper-like sheet product of collapsed cells, comprising longitudinally stretching the tube between said orifice and said rotating pressure rolls, the longitudinal and lateral stretching combining to effect an area production rate which is at least twice the natural area production rate.

2. Method of claim 1 wherein the extent of said lateral stretching approximates the extent of said longitudinal stretching.

3. Method of claim 2 wherein the lateral and longitudinal stretching each effect a linear increase which is at least about 1.5×, resulting in an increase in area production rate which is at least about 2.25× the natural area production rate.

4. Method of claim 1 wherein said hydrocarbon polymer is polyethylene.

5. Method of claim 1 wherein the semi-textile-like or paper-like sheet product of collapsed cells is thereafter subjected to bi-lateral restraining forces while heating it to a temperature between the glass transition temperature and crystalline melting point of the polymer.

References Cited by the Examiner

UNITED STATES PATENTS

| | | | |
|---|---|---|---|
| 2,995,779 | 8/1961 | Winter | 264—210 |
| 3,102,865 | 9/1963 | Sneary et al. | 264—53 XR |
| 3,227,784 | 1/1966 | Blades et al. | 264—53 |
| 3,231,524 | 1/1966 | Simpson | 260—2.5 |

FOREIGN PATENTS

| | | |
|---|---|---|
| 949,655 | 2/1964 | Great Britain. |
| 994,610 | 6/1965 | Great Britain. |

OTHER REFERENCES

Collins, F. H.: "Controlled Density Polystyrene Foam Extrusion." In SPE Journal, July 1960, pp. 705–709.

ALEXANDER H. BRODMERKEL, *Primary Examiner.*

P. E. ANDERSON, *Assistant Examiner.*